May 13, 1930.  E. E. CASELMAN  1,758,144
COMBINATION BAG AND PARCEL RACK AND DOLLY
Filed June 19, 1929   2 Sheets-Sheet 1
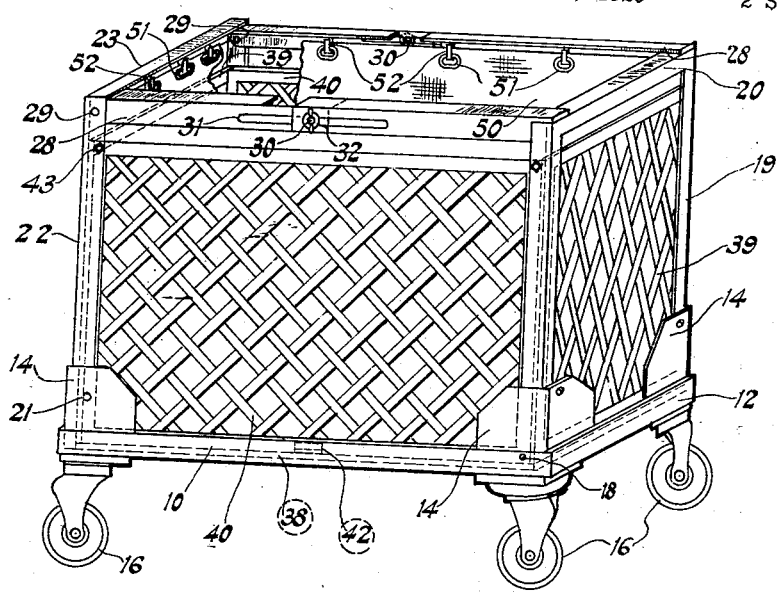
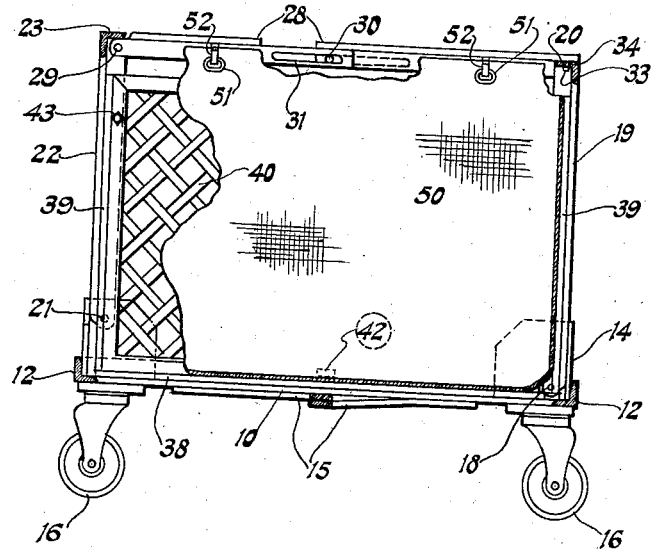
INVENTOR.
EVERETT E. CASELMAN
BY Chas. W. Gerard,
ATTORNEY

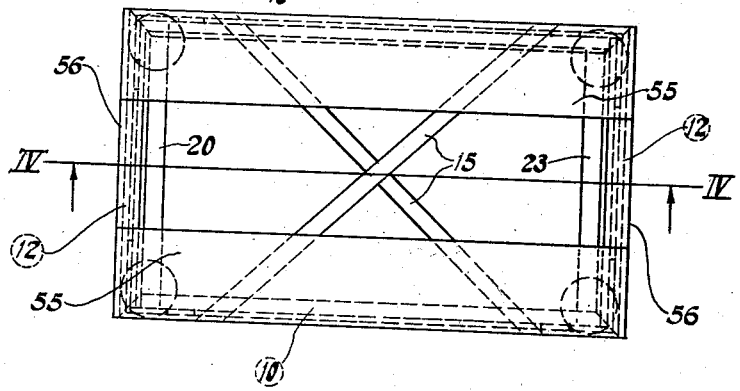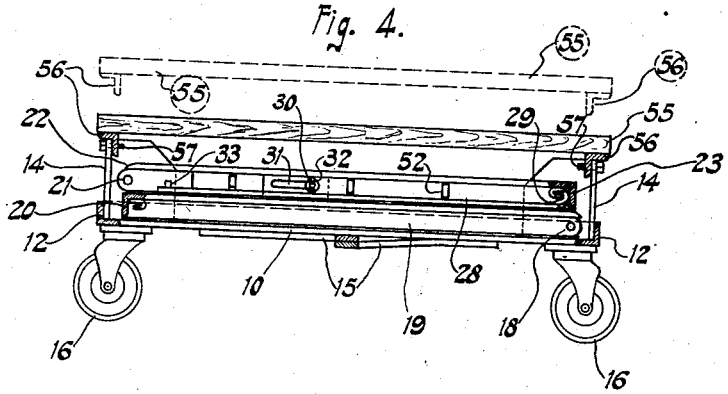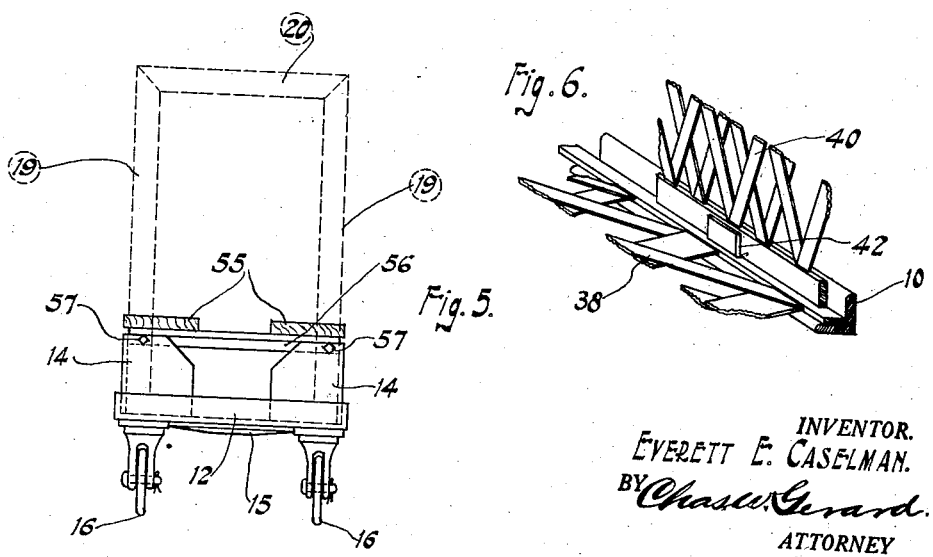

Patented May 13, 1930

1,758,144

UNITED STATES PATENT OFFICE

EVERETT E. CASELMAN, OF KANSAS CITY, KANSAS

COMBINATION BAG AND PARCEL RACK AND DOLLY

Application filed June 19, 1929. Serial No. 372,206.

The present invention relates to dollies, as well as to parcel racks or carriers for packages, waste paper, and the like, and one of the objects in view is to provide a combination structure adapted for use either as a dolly or as a wheeled rack or carrier for the transportation of packages, waste paper, refuse, etc.

Accordingly, I have devised a collapsible rack construction which, in its collapsed or folded form, is adapted to function as a dolly, whereas the construction, when opened up or unfolded, is designed to function as a receptacle for receiving parcels, packages, waste paper or refuse matter, to be transported from place to place.

A further object of the invention is to devise an apparatus in which the rack structure may also function as a bag carrier provided with means for holding a sack or bag in open or distended position for receiving small articles, waste paper or other refuse requiring such form of receptacle.

With these general objects in view, the invention will now be described by reference to the accompanying drawings illustrating suitable forms of embodiment of my improvements which I have found to be practical, after which those features and combinations deemed to be novel will be particularly set forth and claimed.

In the drawings—

Figure 1 is a perspective view illustrating a combination dolly and bag and parcel rack structure, embodying the present features of improvement;

Figure 2 is a longitudinal vertical sectional view of the same (with certain portions broken partly away);

Figure 3 is a plan view of the device in folded or collapsed position and with the dolly platform mounted in operative position;

Figure 4 is a longitudinal sectional view, representing a section taken on the line IV—IV of Figure 3;

Figure 5 is an end view of the same, with dotted lines indicating the rack frame structure; and Figure 6 is a perspective detail showing one of the panel retaining clips hereinafter referred to.

Referring now to the drawings in detail, these illustrate the improved construction as comprising a base supporting frame made up of side angle pieces 10 and end angle pieces 12 suitably connected in substantially rectangular form by means of upright angle or corner brackets 14, the said side angle pieces being also connected and braced by means of diagonal strap pieces 15, as illustrated in Figure 3.

Beneath each of its corners the frame is provided with a roller support comprising a swivel or caster wheel 16, which is preferably of a rubber or cushion-tread type to avoid any marring action or injury to floor surfaces, as well as to provide a silent rolling action.

To the bracket members 14 at one end of the supporting frame are pivotally connected, as indicated at 18, the sides 19 of a swinging rack frame, of rigid angle iron construction, having the outer ends of said sides connected by a cross-bar member 20. To the bracket members 14 at the other end of the supporting frame are pivotally connected, as indicated at 21, the sides 22 of a similar swinging rack frame with cross member 23, but having somewhat shorter sides, with the pivots 21 thereof correspondingly higher up in the brackets in order to adapt said shorter rack frame to fold over the first frame into parallel relation therewith when the rack structure is collapsed as illustrated in Figure 4. When opened up, the vertical bracket elements 14 limit the outward swinging movement of the sides 19 and 22 and brace the same in vertical position as illustrated in Figures 1 and 2.

For securing the rack frames in upright position (i. e., holding them against inward swinging movement), and completing the rack or bag holding structure, a pair of sectional and extensible side bars 28 are pivotally connected, as indicated at 29, to the outer ends of the sides 22 of the shorter end rack frame, the sections of said bars 28 being slidingly connected as by means of bolts or pins 30 and slots 31 and adapted to be secured in either shortened or extended relation by means of nuts 32. This construction permits the sectional bars 28 to be either collapsed or folded within the corresponding rack frame as illustrated in Figure 4 or extended into latching engagement with the other rack frame, as by means of bolts 33 and openings 34, as shown as illustrated in Figures 1 and 2.

As a further component of the parcel or package rack structure, a set of panels of suitable lattice work is provided, comprising a bottom panel 38 adapted to be placed upon the angle pieces 10, 12, comprising the base or supporting frame, a pair of end panels 39 and side panels 40 adapted to be supported in upright position upon the end and side margins, respectively, of the bottom panel 38, with the ends of the panels 40 abutting against the sides of the panels 39 and thereby bracing the latter against the end rack frames, as shown in Figures 1 and 2. Suitable clips 42 (of U-shape) carried by the sides of the bottom panel 38 engage and retain the bottom edges of the side panels 40, and the upper corners of the latter are detachably secured by bolts 43 to the corresponding corners of the end rack frames.

For waste paper, scraps of refuse and the like, such as is collected in office buildings by the janitors, a sack or bag 50 of canvas or equivalent material may be used, having its upper edges provided with suitable eyelets 51 for suspending the bag within the rack frame structure, which is provided with hooks 52 on the inner sides of the bars 28 and the cross-bars 20, 23, thereby fully distending the mouth of the bag in addition to securely supporting the same within the rack frame members. In such use of the construction, the lattice panels may, or may not, be used as desired—said panels being sufficiently low to permit the bag to be attached to the hooks with the panels still in place, if preferred.

In providing for the use of the apparatus as a dolly device, the panels and the bag member are removed, and the remaining parts are simply folded or collapsed upon the top of the base supporting frame, as shown in Figures 3 to 5, whereupon a rectangular top frame comprising side members 55 secured to the ends of a pair of cross-angle pieces 56, is secured over the folded parts, as by bolts 57 in engagement with the upper edges of the corner brackets 14. With the parts thus secured, and compactly connected together, this top platform constitutes a firm platform for the dolly form of the appliance, and the resulting structure functions in all respects as a dolly device suitable for the transporting of furniture and the like, from place to place.

It is thus apparent that I have devised a practical and efficient combination structure, adapted to fulfill all the desired objects of my invention, including its use as a strong and durable dolly device, and also as a parcel or package carrier adapted to be wheeled through store rooms, corridors or elsewhere, for conveying goods from one point to another; likewise, the rack frame answers all the requirements of a bag support for holding bags in fully distended form and for convenient movement, as in office cleaning operations for the removal of waste paper, refuse, etc.,—a great advantage over the prevailing method of carrying or dragging around the unsupported and undistended bags for this purpose. The apparatus is easy to manipulate and to adjust or change into its different forms of use; and moreover, the construction is of a simple and compact character and relatively inexpensive and economical to manufacture.

While I have illustrated and described what represents one practical and satisfactory form of embodiment of the proposed improvements, I desire to be understood as reserving the right to make all such changes or modifications as may fairly fall within the scope of the appended claims.

Having thus described my invention, what I claim to be new and desire to secure by Letters-Patent is:

1. In apparatus of the character described, the combination of a wheeled base frame, rack members pivotally connected with said base frame and adapted to be collapsed thereon or opened up into upright position, a bottom panel member mounted upon said base frame, vertical panel members removably mounted upon the edges of said bottom panel, and means for maintaining said vertical panel members in upright position.

2. In apparatus of the character described, the combination of a wheeled base frame, end rack members pivotally connected with said base frame and adapted to be collapsed thereon or opened up into upright position, extensible bars pivotally connected to one of said rack members and detachably connected to the other rack member for latching said rack members in upright position, hook elements carried by said bars and the upper ends of said rack members, and a bag engaged by said hook elements and supported thereby in distended position within said rack members.

3. In apparatus of the character described, the combination of a wheeled base frame, provided with corner bracket members, rack members pivotally connected to said bracket members and adapted to be folded on said base frame or opened up into upright position, and a platform frame removably associated with said rack and bracket members and the latter having means adapted to receive said platform frame in superposed relation to said folded rack members.

4. In apparatus of the character described, the combination of a wheeled base frame including upright corner brackets, end rack members pivotally connected with said brackets and limited thereby as to outward swinging movement, said rack members being adapted to fold inward into collapsed position upon said base frame, extensible bars pivotally connected to one of said rack members and detachably connected to the other rack member for latching said rack members in upright position, and a platform frame associated with said rack members and brackets and the latter having means adapted to receive said platform frame in superposed relation to said folded rack members.

In witness whereof I hereunto affix my signature.

EVERETT E. CASELMAN.